(12) United States Patent
Blumenau (10) Patent No.: US 6,460,079 B1
(45) Date of Patent: Oct. 1, 2002

(54) METHOD AND SYSTEM FOR THE DISCOVERY OF COOKIES AND OTHER CLIENT INFORMATION

(75) Inventor: Trevor Blumenau, San Francisco, CA (US)

(73) Assignee: Nielsen Media Research, Inc., Schaumburg, IL (US)

( * ) Notice: Subject to any disclaimer, the term of this patent is extended or adjusted under 35 U.S.C. 154(b) by 0 days.

(21) Appl. No.: 09/262,253

(22) Filed: Mar. 4, 1999

(51) Int. Cl.[7] .............................................. G06F 13/00
(52) U.S. Cl. ........................ 709/223; 709/203; 709/245
(58) Field of Search ................................ 709/203, 223, 709/224, 245

(56) References Cited

U.S. PATENT DOCUMENTS

| | | | |
|---|---|---|---|
| 3,540,003 A | 11/1970 | Murphy | 714/48 |
| 3,818,458 A | 6/1974 | Deese | 714/47 |
| 3,906,450 A | 9/1975 | Prado, Jr. | 725/14 |
| 3,906,454 A | 9/1975 | Martin | 714/45 |
| T955,010 I4 | 2/1977 | Ragonese et al. | 444/1 |
| 4,168,396 A | 9/1979 | Best | 713/190 |
| 4,230,990 A | 10/1980 | Lert, Jr. et al. | 725/22 |
| 4,232,193 A | 11/1980 | Gerard | 380/36 |
| 4,306,289 A | 12/1981 | Lumley | 713/190 |
| 4,319,079 A | 3/1982 | Best | 713/190 |
| 4,361,832 A | 11/1982 | Cole | 340/505 |
| 4,367,525 A | 1/1983 | Brown et al. | 710/18 |
| 4,558,413 A | 12/1985 | Schmidt et al. | 707/203 |
| 4,588,991 A | 5/1986 | Atalla | 713/165 |
| 4,590,550 A | 5/1986 | Eilert et al. | 714/45 |
| 4,595,950 A | 6/1986 | Löfberg | 380/202 |
| 4,621,325 A | 11/1986 | Naftzger et al. | 705/30 |
| 4,658,093 A | 4/1987 | Hellman | 705/52 |
| 4,672,572 A | 6/1987 | Alsberg | 713/202 |
| 4,685,056 A | 8/1987 | Barnsdale, Jr. et al. | 711/164 |
| 4,696,034 A | 9/1987 | Wiedemer | 380/230 |
| 4,703,324 A | 10/1987 | White | 340/825.14 |
| 4,712,097 A | 12/1987 | Hashimoto | 379/40 |
| 4,718,005 A | 1/1988 | Feigenbaum et al. | 709/222 |
| 4,720,782 A | 1/1988 | Kovalcin | 700/83 |
| 4,734,865 A | 3/1988 | Scullion et al. | 700/222 |
| 4,740,890 A | 4/1988 | William | 713/200 |
| 4,747,139 A | 5/1988 | Taaffe | 380/44 |

(List continued on next page.)

FOREIGN PATENT DOCUMENTS

| | | |
|---|---|---|
| EP | 0 744 695 | 11/1966 |
| EP | 0 325 219 | 7/1989 |
| EP | 0 703 683 | 3/1996 |
| EP | 0 744 695 | 11/1996 |
| GB | 2 176 639 | 12/1986 |
| JP | 5-324352 | 12/1993 |
| WO | WO 96/00950 | 1/1996 |
| WO | WO 96/17467 | 6/1996 |
| WO | WO 96/28904 | 9/1996 |
| WO | WO 96/322815 | 10/1996 |
| WO | WO 96/37983 | 11/1996 |
| WO | WO 9641495 | 12/1996 |
| WO | WO 96/41495 | 12/1996 |

*Primary Examiner*—Kenneth R. Coulter
(74) *Attorney, Agent, or Firm*—Katten Muchin Zavis Rosenman (57) ABSTRACT

A client information discovery arrangement is provided to discover client information relating to access by the clients of a plurality of web sites. Each of the clients accesses a corresponding web page stored at a central facility. The web page contains a URL for each of the web sites and an ID uniquely identifying the corresponding client. Each client transmits, either to each of the web sites corresponding to the URLs of the web page or to the central facility, the ID of the corresponding client and the client information which are stored by the client and which correspond to each of at least some of the URLs. The client information may include cookies.

16 Claims, 5 Drawing Sheets

U.S. PATENT DOCUMENTS

| | | | |
|---|---|---|---|
| 4,754,262 A | 6/1988 | Hackett et al. | 340/525 |
| 4,757,533 A | 7/1988 | Allen et al. | 713/192 |
| 4,791,565 A | 12/1988 | Dunham et al. | 713/200 |
| 4,821,178 A | 4/1989 | Levin et al. | 714/47 |
| 4,825,354 A | 4/1989 | Agrawal et al. | 707/10 |
| 4,827,508 A | 5/1989 | Shear | 705/53 |
| 4,866,769 A | 9/1989 | Karp | 705/56 |
| 4,914,689 A | 4/1990 | Quade et al. | 379/142 |
| 4,926,162 A | 5/1990 | Pickell | 340/534 |
| 4,940,976 A | 7/1990 | Gastouniotis et al. | 340/870.02 |
| 4,956,769 A | 9/1990 | Smith | 707/9 |
| 4,970,644 A | 11/1990 | Berneking et al. | 702/6 |
| 4,977,594 A | 12/1990 | Shear | 705/53 |
| 5,023,907 A | 6/1991 | Johnson et al. | 710/200 |
| 5,032,979 A | 7/1991 | Hecht et al. | 713/201 |
| 5,086,386 A | 2/1992 | Islam | 707/202 |
| 5,113,518 A | 5/1992 | Durst, Jr. et al. | 713/200 |
| 5,182,770 A | 1/1993 | Medveczky et al. | 705/56 |
| 5,204,897 A | 4/1993 | Wyman | 710/200 |
| 5,214,780 A | 5/1993 | Ingoglia et al. | 709/106 |
| 5,233,642 A | 8/1993 | Renton | 455/405 |
| 5,283,734 A | 2/1994 | Von Kohorn | 463/17 |
| 5,287,408 A | 2/1994 | Samson | 705/59 |
| 5,343,239 A | 8/1994 | Lappington et al. | 725/136 |
| 5,355,484 A | 10/1994 | Record et al. | 717/4 |
| 5,374,951 A | 12/1994 | Welsh | 725/20 |
| 5,377,269 A | 12/1994 | Heptig et al. | 713/202 |
| 5,388,211 A | 2/1995 | Hornbuckle | 717/11 |
| 5,406,269 A | 4/1995 | Baran | 340/825.17 |
| 5,410,598 A | 4/1995 | Shear | 705/53 |
| 5,440,738 A | 8/1995 | Bowman et al. | 707/6 |
| 5,444,642 A | 8/1995 | Montgomery et al. | 702/91 |
| 5,450,134 A | 9/1995 | Legate | 348/467 |
| 5,483,658 A | 1/1996 | Grube et al. | 713/200 |
| 5,497,479 A | 3/1996 | Hornbuckle | 463/229 |
| 5,499,340 A | 3/1996 | Barritz | 714/47 |
| 5,584,050 A | 12/1996 | Lyons | 455/67.1 |
| 5,594,934 A | 1/1997 | Lu et al. | 725/18 |
| 5,675,510 A | 10/1997 | Coffey et al. | 709/224 |
| 5,796,952 A | 8/1998 | Davis et al. | 709/224 |
| 6,035,339 A * | 3/2000 | Agraharam et al. | 709/246 |
| 6,098,093 A * | 8/2000 | Bayeh et al. | 709/203 |
| 6,102,406 A * | 8/2000 | Miles et al. | 273/430 |
| 6,138,155 A * | 10/2000 | Davis et al. | 709/224 |
| 6,164,975 A * | 12/2000 | Weingarden et al. | 434/322 |
| 6,223,215 B1 * | 4/2001 | Hunt et al. | 709/217 |
| 6,247,050 B1 * | 6/2001 | Tso et al. | 709/224 |

* cited by examiner

METHOD AND SYSTEM FOR THE DISCOVERY OF COOKIES AND OTHER CLIENT INFORMATION

RELATED APPLICATIONS

The present invention and the invention disclosed in U.S. patent application Ser. No. 09/285,539 are related.

TECHNICAL FIELD OF THE INVENTION

The present invention relates to. the discovery of cookies and other client information.

BACKGROUND OF THE INVENTION

The Internet has proven to be an efficient and popular mechanism for the dissemination of information from web sites to clients. Web sites in many cases are operated by organizations, such as businesses, governmental agencies, educational institutions, and the like, and clients are often consumers who use computers usually located in their dwellings to access the content provided by web sites. However, clients may also be other businesses, governmental agencies, educational institutions, and the like.

The operator of a web site has an interest in the number of clients that access its web site as well as the demographics of those clients. For example, such information is useful in giving an advertiser some assurance that its advertisement will reach enough clients of the type who are typically interested in the product or service offered by the advertiser to warrant placing the advertisement with the web site. Also, such information is instructive to the web site operator in creating web pages for a particular target audience.

In accordance with the present invention, cookies and/or other client information can provide useful information about the usage of a web site by its clients. Cookies are typically downloaded from web sites to the clients that visit them. A web browser executing on a client's computer sets aside a small amount of memory (usually 0 to 4 kilobytes) for each web site server visited by the client. Accordingly, when the client receives a cookie from a web site, the client's web browser stores the cookie in the memory set aside for that web site. The contents of the memory, and the length of time it is maintained, are specified by the web site.

A cookie is used by web sites to distinguish web browsers/ clients from one another. In other words, a cookie allows a web site to determine whether a client request is received from the same client that previously made some other request, or whether a client request has been received from a wholly different client than the client making the previous request. In short, cookies give web browser client applications uniqueness. This uniqueness is important to a web site's ability to keep track of the state of each of many client requests. Therefore, cookies permit a web site to distinguish one client from another, to distinguish sessions of use by a single client, and to keep track of many other important aspects of the display of content on a client's computer.

Cookies are added to the headers of the HTTP transfer protocol. Essentially, when a client makes a request of a web site, the web site may issue a storage directive in the header of its response to the client's request. Such a directive may look like the following:

Set-Cookie: CUSTOMER=WILE_E_COYOTE; expires=Wednesday, Nov. 9, 1999, 23:12:40 GMT.

In the above example, "CUSTOMER=WILE_E_ COYOTE" is stored by the browser operating on the client's computer until Nov. 9, 1999. However, a web site need not specify any expiration date for the cookie, in which case the cookie expires when the client's browser is exited.

Whenever the client again makes a subsequent request to the same web site, the client's browser will include in the header of such a request the following string from the date that the cookie is originally set until the cookie expires:

Cookie: CUSTOMER=WILE_E_COYOTE.

A web site can overwrite a cookie that it sets at a client's computer. Also, a web site can store multiple cookies on a client's computer. In this case, a client's browser will place the following general statement in the request header when the client makes a request:

Cookie: NAME1=STRING1; NAME2=STRING2; . . .

The general syntax used by a server in setting a cookie is as follows:

Set-Cookie
  name=value
  [;EXPIRES=dateValue]
  [;DOMAIN=domainName]
  [;PATH=pathName]
  [;SECURE]

The use of the EXPIRES clause in a cookie is described above. The DOMAIN clause in a cookie is optional and is used to specify a set of machines in a DOMAIN that should have access to the cookie content. If a web site does not specify a DOMAIN name for this clause, the DOMAIN clause defaults to the name of the web site that issued the Set-Cookie directive so that only this web site has access to the corresponding cookie. In other words, only a cookie, which matches the DOMAIN specified by a particular web site that set the cookie, will be sent by the client to that web site in the header of an HTTP request. Accordingly, this DOMAIN clause is the fundamental basis for the security of cookies because one web site has no access to the cookies of another web site.

The PATH clause in the cookie is optional and is seldom used. The PATH clause forces a further limitation on when cookie information is sent from the client to the web site. Only requests that lie within the PATH of the specified DOMAIN contain the cookie in the request's HTTP header.

The SECURE clause in the cookie is also optional and, if set, insures that the cookie is transmitted over a SECURE socket session. If the SECURE clause in the cookie is not set, it is assumed that the cookie data is accessible to any document or CGI program that meets the other DOMAIN and PATH matching properties.

Many web sites currently use cookies to track visitors to their servers. This tracking is easily achieved, for example, by setting a unique cookie (such as a counted sequence or a date/time stamp) for each new client visiting a site. Repeat clients are not re-tagged within the expiration period of previously set cookies. Accordingly, the site can distinguish requests from one client to another.

Web sites, however, generally have no information about their clients other than the clients' prior visit information. Therefore, web sites do not, as a rule, have demographic information about the clients who visit them.

The present invention is directed to an arrangement in which cookies and/or other client information can be discovered by a third party who can then match the discovered cookies and other information to demographic information, if so desired.

SUMMARY OF THE INVENTION

In accordance with one aspect of the present invention, a system comprises first parties, second parties, and a third party interconnected in a network. The first parties are web sites, the second parties are clients of the web sites, and the third party is a central facility. The central facility is arranged to initiate discovery of client information from at least one of the first and second parties.

In accordance with another aspect of the present invention, a method of discovering client information relating to access by the clients of a plurality of web sites comprising the following steps: a) accessing, by each of the clients, a web page stored at a central facility, wherein the web page contains a URL for each of the web sites; and, b) transmitting, from each client either to each of the web sites corresponding to the URLs of the web page or to the central facility, any client information which the client has stored and which corresponds to the URLs.

In accordance with a still further aspect of the present invention, a computer readable storage medium has program code stored thereon. The program code, when executed by a computer of a client, performs the following tasks: a) reading cookies transmitted to the client by plural web sites; and, b) transmitting the cookies to a central facility.

BRIEF DESCRIPTION OF THE DRAWINGS

These and other features and advantages of the present invention will become more apparent from a detailed consideration of the invention when taken in conjunction with the drawings in which.

DETAILED DESCRIPTION

Figure 1:
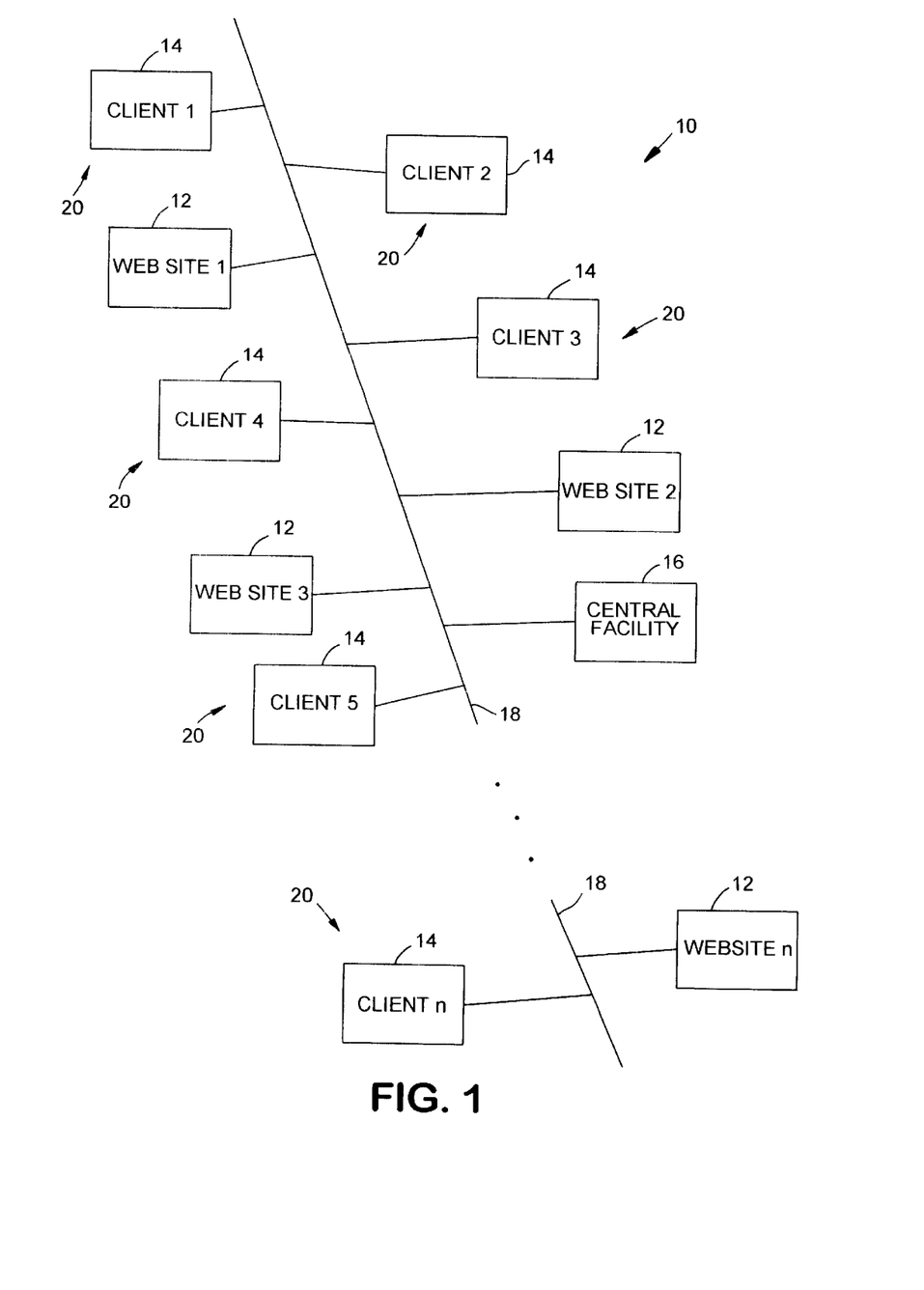
FIG. 1 illustrates a network in which the present invention may be practiced.

A client information discovery system 10 is shown in FIG. 1. The client information discovery system 10 includes a plurality of web sites 12, a plurality of clients 14, and a central facility 16 interconnected by a network 18. Each of the clients 14 has a corresponding computer connected to the network 18, and the web sites 12 are arranged to provide content to their clients 14 over the network 18.

The clients 14 may comprise all of the clients of the web sites 12 or a subset of the clients of the web sites 12. In this latter case, each client 12 in the subset may be located at a corresponding statistically selected site 20. The number and location of these statistically selected sites 20, for example, can depend upon statistical sampling methods so that a sufficient number of the statistically selected sites 20 are selected in order to provide data which is representative of the population segment(s) of interest.

The network 18, for example, may be the Internet. As is known, the Internet is typically accessed through the public telephone network. However, the network 18 may involve other arrangements such as local area networks, cable networks, satellite networks, and other networks through which content is electronically disseminated.

The central facility 16 is arranged to initiate the discovery of client information. The central facility 16 may obtain this client information from the web sites 12 and/or from the clients 14. For the purposes of the description below, it is assumed that this client information comprises cookies which are stored in the computers of the clients 14 by the web sites 12. However, it should be understood that client information may include information in addition to or alternative to cookies. For example, client information can include dates and times of data transfer requests, request types, URLs, result codes, the number of data bytes transferred, the time required to complete a data transfer, preference items, and/or other relevant information. Moreover, for purposes of the present inventions, cookies may mean the entire cookies or desired portions thereof.

For the purpose of discovering cookies, a central facility sub-server can be physically added to the server pool of each of the web sites 12. Then, by including suitable references to material on each of the web sites 12 in a web page resident on a server of the central facility 16, the clients 14 can be induced to issue HTTP requests to each of the central facility sub-servers distributed among the web sites 12 being metered. Accordingly, this web page is assembled with references to the central facility sub-servers resident on the servers of the web sites 12. Each such reference is a fully qualified URL. The following is an example of such a Web page:

<html>
<head><title>Welcome Client</title></head>
<body>
Please wait for this page to full load.
  <iframe width=468 height=60 src="http://sub-server.domain1.com/clientID=12345">
  <iframe width=468 height=60 src="http://sub-server.domain2.com/clientID=12345">
  <iframe width=468 height=60 src="http://sub-server.domain3.com/clientID=12345">
  <iframe width=468 height=60 src="http://sub-server.domain4.com/clientID=12345">
  <iframe width=468 height=60 src="http://sub-server.domain5.com/clientID=12345">
  <iframe width=468 height=60 src="http://sub-server.domain6.com/clientID=12345">
</body>
</html>

It is noted that the above web page includes refernces to six central facility sub-servers, where each of the six central facility sub-servers is located at a corresponding one of six of the web sites 12 identified as domain1-domain6. However, this web page may contain more or fewer references to central facility sub-servers depending upon the number of web sites to be metered. It is also noted that the above web page should be dynamically generated for each of the clients 14, so that each ID uniquely identifying a corresponding one of the clients 14 is included in the web page when that client accesses this web page. With this arrangement, the IDs of the clients 14 are paired with the cookies and are included in any requests that the clients 14 make to the web sites 12. In this way, the central facility sub-servers can discover the cookies stored on the computers of the clients 14 by the web sites 12. Also, the central facility 16 may store demographic information relating to the clients 14 corresponding to their IDs.

Figure 2:
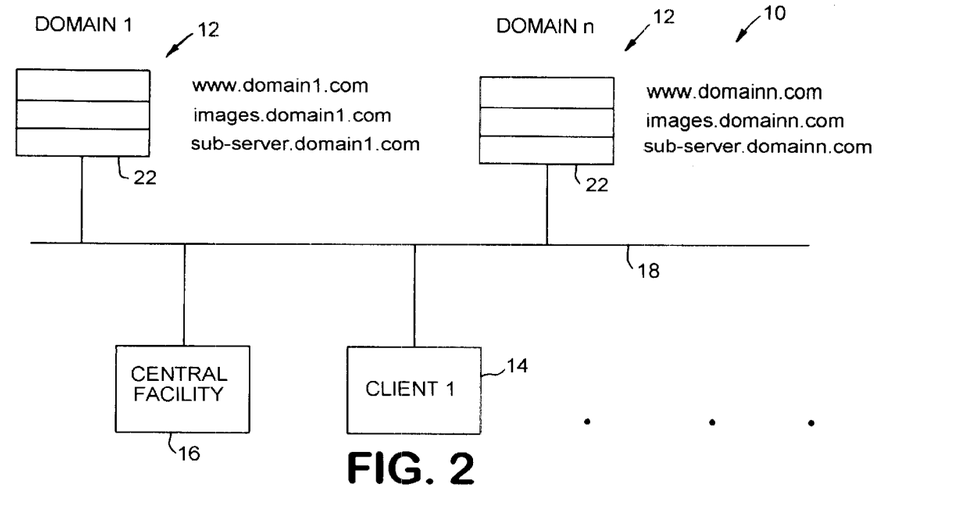
FIG. 2 illustrates a first embodiment of the present invention.

By placing central facility sub-servers at each of the web sites 12 being metered, the system architecture has the appearance shown in FIG. 2. In FIG. 2, each of the web sites 12 being metered is shown as a corresponding domain, and each domain has a central facility sub-server 22 denoted as sub-server.domainn. It is noted that only two of the web sites 12 are represented in the system architecture shown in FIG. 2. However, this system architecture should include as many of the web sites 12 as are being metered by the central facility 16 with the use of the clients 14.

Figure 3:
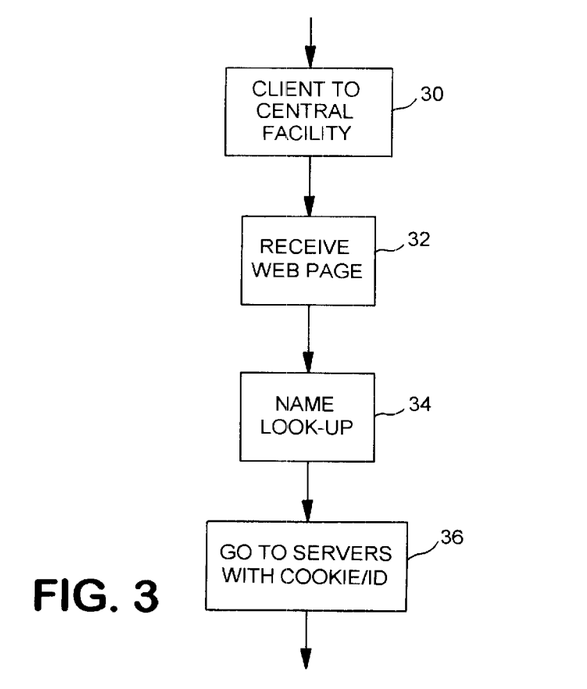
FIG. 3 illustrates functions executed by a computer of a client in accordance with the first embodiment of the present invention.
Figure 4:
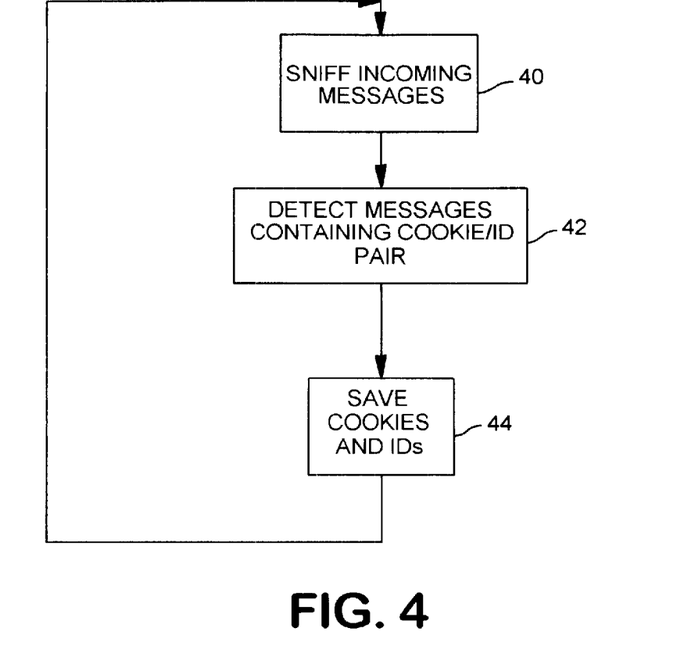
FIG. 4 illustrates a flow chart of a program that may be executed by a central facility sub-server at a web site in accordance with the first embodiment of the present invention.
Figure 5:
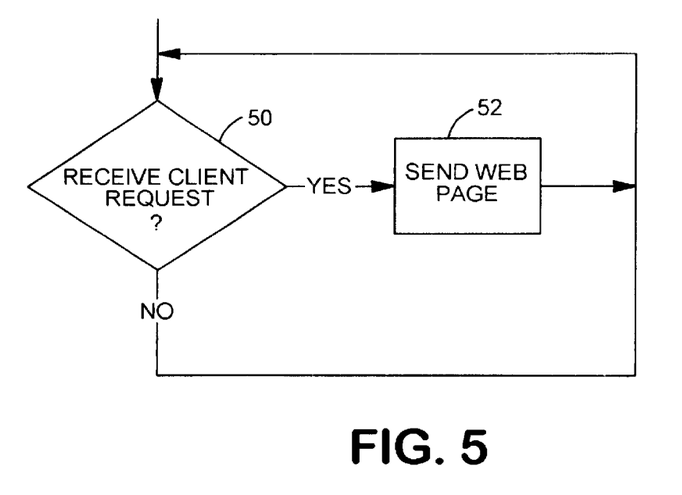
FIG. 5 illustrates functions executed by a server of a central facility in accordance with the first embodiment of the present invention.

The discovery of cookies by use of the system architecture shown in FIG. 2 is implemented according to the flow charts illustrated in FIGS. 3, 4 and 5. The flow chart shown in FIG. 3 represents functions performed by the computer of each of the clients 14. The flow chart shown in FIG. 4 represents functions performed by each of the central facility sub-servers 22 loaded on the servers of the web sites 12. The flow chart shown in FIG. 5 represents functions performed by the server (i.e., computer) at the central facility 16.

As shown in FIG. 3, a client at a block 30 accesses the web page which is described above and which is maintained at the central facility 16. This access, for example, may be periodic, such as once a month, or this access may be a one time access. As a result of this access, the web page maintained at the central facility 16 is downloaded by the central facility 16 and is received by the accessing client at a block 32.

At a block 34, the client looks up the name of the web site 12 corresponding to a first of the URLs contained in the downloaded web page. This name look-up permits the client at a block 36 to send the cookie corresponding to the web site 12 identified in the URL, if the cookie exists in the memory of the computer of that client. If the client transmits a cookie to that web site 12, the client at the block 36 also transmits its ID contained in the downloaded web page with the cookie. The functions of the blocks 34 and 36 are then repeated for each of the other URLs contained in the downloaded web page.

Thus, if web site 1 of the web sites 12 had previously stored cookie "A" on the computer of client 1, and if the web page downloaded to client 1 contains a URL for web site 1, then client 1 at the block 36 sends cookie "A" and the client's ID to web site 1. Also, if web site 2 of the web sites 12 had previously stored cookie "B" on the computer of client 1, and if the web page downloaded to client 2 contains a URL for web site 2, then client 1 at the block 36 sends cookie "B" and the client's ID to web site 2, and so.

The function performed by the client at the block 30 is a manual operation performed by the client at the behest of the central facility. Thus, the client at the block 30 enters an HTTP request with the URL of the central facility into the client's computer and sends the HTTP request over the network 16. The functions performed at the blocks 32–36 are normal operations of a browser. Accordingly, the present invention requires little or no intrusion into the clients 12.

As shown in FIG. 4, the central facility sub-server at each of the web sites 12 listens for the incoming messages at a block 40. When the central facility sub-server detects a message containing a cookie/ID pair at a block 42, the central facility sub-server at a block 44 saves the cookie and ID in the message. Accordingly, the cookies which are stored on the computers of the clients 12 by the web sites 12 are discovered.

As shown in FIG. 5, if the central facility 16 at a block 50 receives a request from one of the clients 14 to access the web page maintained at the central facility 16, the central facility 16 at a block 52 inserts that client's unique ID into that web page with the URLs and transmits the web page to the requesting client. The functions performed at the blocks 50 and 52 are, for the most part, normal operations of a server. However, code must be provided in connection with the block 52 so that, when a client makes a request for the web page described above, the server of the central facility 16 inserts the ID of that client into the web page before downloading the web page to the client. The central facility 16 then has the option of obtaining the discovered cookies and/or other client information from the web sites 12.

Figure 6:
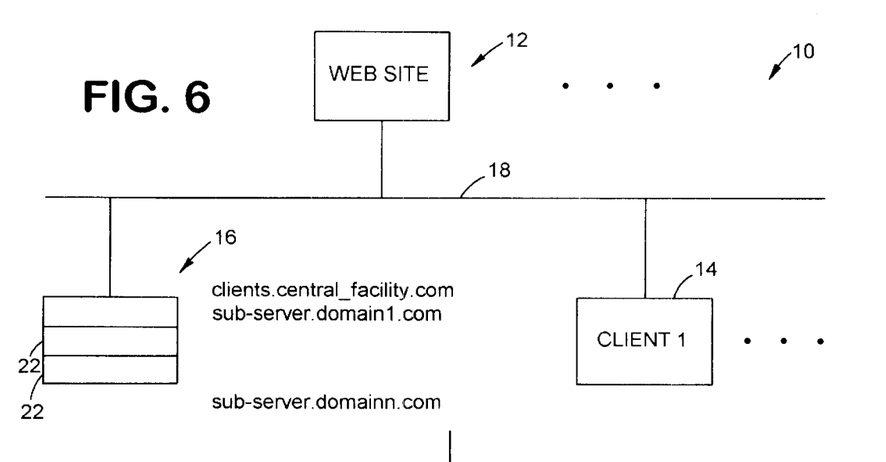
FIG. 6 illustrates a second embodiment of the present invention.

It is not mandatory that the central facility sub-servers 22 reside on the servers at the web sites 12. For example, the central facility sub-servers 22 could be physically located behind appropriate firewalls on the server of the central facility 16, as shown in FIG. 6. In this arrangement, the names of the central facility sub-servers 22 are added to the entry tables of the Domain Name Systems of the web sites 12. Accordingly, the Domain Name System of each of the web sites 12 establishes pairings between the names of the central facility sub-servers 22 (such as sub-server.domainn) and the IP address of the server at the central facility 16. Thus, so long as the Domain Name System tables of the web sites 12 point to the IP address of the server at the central facility 16, the clients' cookie/ID pairs will be sent to the central facility 16.

Thus, the system architecture shown in FIG. 2 may be simplified because multiple names can be established for a single IP address in the Domain Name System. Accordingly, the system architecture for the web site usage metering system 10 can be simplified to that shown in FIG. 6. The central facility sub-servers 22 are stored on the server of the central facility 16. The pairings between the names of the central facility sub-servers 22 and the IP address of the server of the central facility 16 are stored in the Domain Name Systems of the web sites 12.

Figure 7:
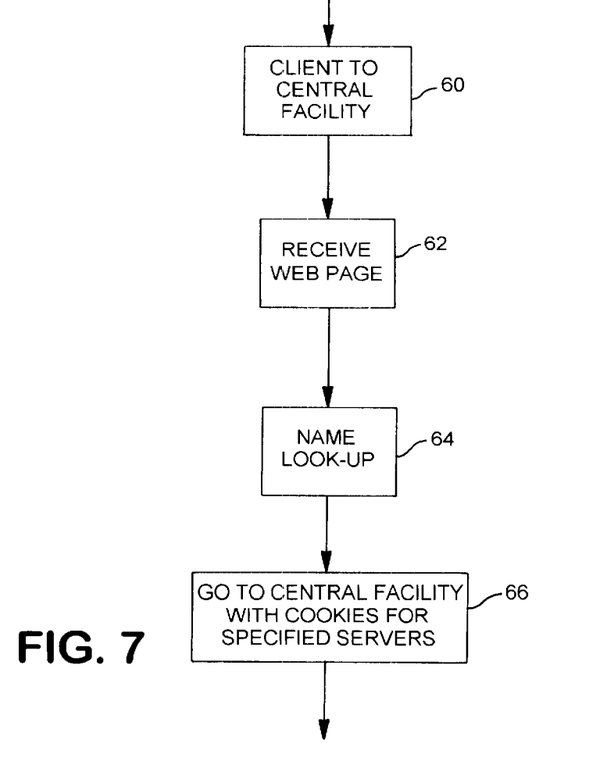
FIG. 7 illustrates functions executed by a computer of a client in accordance with the second embodiment of the present invention; and, FIG. 8 illustrates functions executed by a server of the central facility in accordance with the second embodiment of the present invention.

The clients 14 in the system architecture shown in FIG. 6 operate in accordance with the flow chart shown in FIG. 7. As shown in FIG. 7, a client at a block 60 accesses the web page which is described above and which is maintained at the central facility 16. As a result of this access, the web page maintained at the central facility 16 is downloaded by the central facility 16 and is received by the accessing client at a block 62.

At a block 64, the client looks up the name of the web site 12 corresponding to a first of the URLs contained in the downloaded web page. Because the Domain Name System includes both the name of the central facility sub-server contained in the first URL and the IP address of the server at the central facility 18, the Domain Name System returns that IP address to the client. As a consequence of receiving this IP address, the client's browser at a block 66 sends the cookie corresponding to the web site 12 identified in the URL to the IP address of the central facility 18, if the cookie exists in the memory of the computer of that client. If the client at the block 66 transmits a cookie to the central facility 18, the client at the block 66 may also transmit its ID contained in the downloaded web page with the cookie. The functions of the blocks 34 and 36 are then repeated for each of the other URLs contained in the downloaded web page.

As in the case of FIG. 3, the function performed by the client at the block 60 is a manual operation performed by the client at the behest of the central facility. Thus, the client at the block 60 enters an HTTP request with the URL of the central facility into the client's computer and sends the HTTP request over the network 16. The functions performed at the blocks 62–66 are normal operations of a browser. Accordingly, the present invention again requires little or no intrusion into the clients 12.

Figure 8:
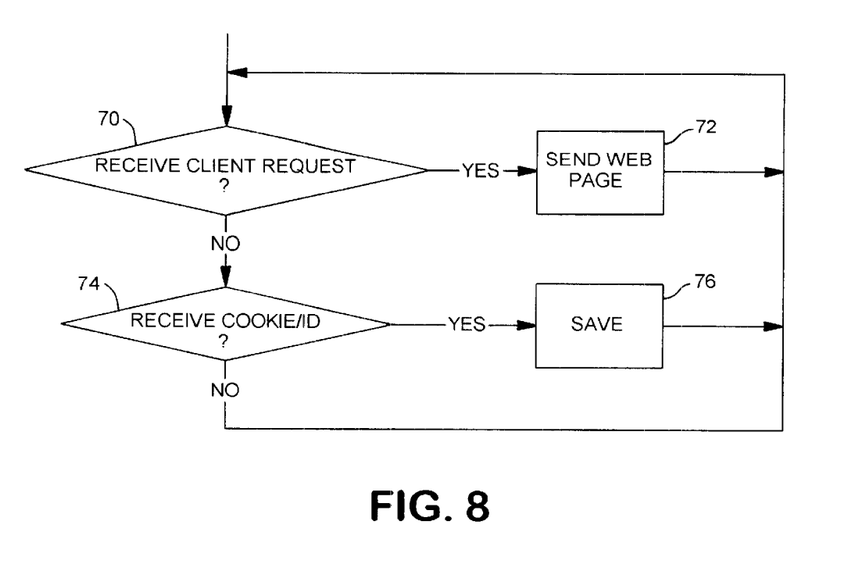

The server at the central facility 16 operates in accordance with the flow chart shown in FIG. 8. Thus, if the central facility 16 receives a request at a block 70 from a client for the web page stored at the central facility 16, the central facility 16 at a block 72 inserts the ID for the requesting client into the web page and sends the web page to the requesting client.

If the central facility 16 at a block 74 receives cookie/ID pairs from one of the clients 14 in response to the web page sent by the central facility 16 to the clients 14 at the block 72, the central facility 16 saves the cookie/ID pairs at a block 76.

Certain modifications of the present invention have been discussed above. Other modifications will occur to those practicing in the art of the present invention. For example, instead of the above described approaches to the discovery of client information, a program could be installed on the computers of each of the clients. This program, when executed, may be arranged to read the cookies stored on the computers of the clients and to transmit these cookies to the central facility 16.

Also, a specific web page resident on the server of the central facility 16 has been described above by way of example. Alternatively, other web pages can be designed to carry out the present invention. For example, an HTML page employing JavaScript to control image or frame loading concurrent with demographic data collection could easily be provided.

Moreover, it may not be necessary to the present invention to identify the clients 14 by inserting IDs into the web page by the central facility 16.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

What is claimed is:

1. A system comprising first parties, second parties, and a third party interconnected in a network, wherein the first parties are web sites, wherein the second parties are clients of the web sites, wherein the third party is a central facility, and wherein the central facility is arranged to initiate discovery of client information from at least one of the first and second parties, and wherein the central facility stores a web page, and wherein the web page contains a URL of each web site and wherein the central facility is arranged to append to the URL of each web site an ID uniquely identifying each of the clients.

2. A system comprising first parties, second parties, and a third party interconnected in a network, wherein the first parties are web sites, wherein the second parties are clients of the web sites, wherein the third party is a central facility, and wherein the central facility is arranged to initiate discovery of client information from at least one of the first and second parties, wherein each web site stores a corresponding central facility sub-server and wherein the client information comprises cookies, and wherein the clients are arranged to transmit to the web sites any cookies which the clients have stored and which correspond to the web sites, wherein the clients are arranged to also transmit to the web sites IDs with the cookies, and wherein the IDs uniquely identify the corresponding clients.

3. A system comprising first parties, second parties, and a third party interconnected in a network, wherein the first parties are web sites, wherein the second parties are clients of the web sites, wherein the third party is a central facility, and wherein the central facility is arranged to initiate discovery of client information from at least one of the first and second parties, wherein the central facility stores a web page, and wherein the web page contains a URL of each web site, wherein the central facility is arranged to append to the URLs IDs uniquely identifying the clients.

4. A system comprising first parties, second parties, and a third party interconnected in a network, wherein the first parties are web sites, wherein the second parties are clients of the web sites, wherein the third party is a central facility, and wherein the central facility is arranged to initiate discovery of client information from at least one of the first and second parties, wherein the central facility stores a central facility sub-server corresponding to each of the web sites, wherein a domain name system at each of the web sites contains a name of the central facility sub-server corresponding to the web site, wherein the domain name system at the web sites contains an IP address for the central facility, and wherein the IP address for the central facility is linked to the names of the central facility sub-servers in the domain name system at the web sites.

5. The system of claim 4 wherein the central facility stores a web page, and wherein the web page contains a URL of each web site.

6. The system of claim 5 wherein the central facility is arranged to append to the URLs IDs uniquely identifying the clients.

7. The system of claim 5 wherein the client information comprises cookies, and wherein each client is arranged to access the web page and to respond to the URLs in the web page by transmitting to the central facility any cookies which the client has stored and which correspond to the received URLs.

8. The system of claim 4 wherein the client information comprises cookies, and wherein each client is arranged to transmit to the central facility any cookies which the client has stored and which correspond to the web sites.

9. A system comprising first parties, second parties, and a third party interconnected in a network, wherein the first parties are web sites, wherein the second parties are clients of the web sites, wherein the third party is a central facility, and wherein the central facility is arranged to initiate discovery of client information from at least one of the first and second parties, wherein each of the web sites stores a central facility sub-server, and wherein each of the central facility sub-servers is arranged to detect cookie/ID pairs transmitted to the corresponding web site by the clients, wherein the central facility stores a web page, and wherein the web page contains a URL of each web site and wherein the central facility is arranged to append to the URLs IDs uniquely identifying the clients.

10. The system of claim 9 wherein the client information comprises cookies, and wherein each client is arranged to access the web page and to respond to the URLs in the web page by transmitting to the corresponding web sites the IDs and any cookies which the client has stored and which correspond to the received URLs.

11. A method of discovering client information relating to access by the clients of a plurality of web sites comprising the following steps:

a). accessing, by each of the clients, a web page stored at a central facility, wherein the web page contains a URL for each of the web sites; and, b). transmitting, from each client either to each of the web sites corresponding to the URLs of the web page or to the central facility, any client information which the client has stored and which correspond to the URLs, wherein the central facility stores a central facility sub-server corresponding to each of the web sites, wherein a domain name system at each of the web sites contains a name of the central facility sub-server corresponding to the web site, wherein the domain name system at the web sites contains an IP address for the central facility, and wherein the IP address for the central facility is linked to the names of the central facility sub-servers in the domain name systems at the web sites.

12. The method of claim 11 wherein step b) comprises the steps of (i) performing at least one name look-up request at each of the clients, (ii) receiving the IP address of the central facility in response to the name look-up request, and (iii) transmitting to the received IP address any client information which the client has stored and which correspond to the web site URLs.

13. The method of claim 11 wherein the client information comprises cookies.

14. A method of discovering client information relating to access by the clients of a plurality of web sites comprising the following steps:

a). accessing, by each of the clients, a web page stored at a central facility, wherein the web page contains a URL for each of the web sites; and, b). transmitting, from each client either to each of the web sites corresponding to the URLs of the web page or to the central facility, any client information which the client has stored and which correspond to the URLs, wherein each of the web sites stores a corresponding central facility sub-server, wherein the web page contains an ID unique to a client that accesses the web page, wherein each of the clients transmits in pairs the ID contained in the web page and any client information which the client has stored and which corresponds to the web site URLs, and wherein each of the central facility sub-servers detects the cookie/ID pairs transmitted by the clients.

15. The method of claim 14 wherein step b) comprises the step of each client performing to at least one name look-up request.

16. The method of claim 14 wherein the client information comprises cookies.

* * * * *